Patented Oct. 26, 1948

2,452,166

UNITED STATES PATENT OFFICE 2,452,166

ALKYLATION OF ISOBUTANE WITH ETHYLENE

Herbert E. Vermillion, Fishkill, N. Y., assignor to The Texas Company, New York, N. Y., a corporation of Delaware No Drawing. Application October 26, 1945, Serial No. 624,951

2 Claims. (Cl. 260—683.4)

This invention relates to catalytic isoparaffin alkylation, and more particularly to the alkylation of isobutane with ethylene in the presence of a catalyst consisting essentially of substantially anhydrous liquid HF and a small proportion of $BF_3$ under conditions selected to produce a liquid alkylate containing a major proportion by volume of 2,3-dimethylbutane.

An object of the present invention is to produce good yields of high grade alkylate particularly adapted for aviation fuel or blending stock, and consisting largely or primarily of 2,3-dimethylbutane.

Another object of the invention is to provide a novel process involving certain critical operating conditions for alkylating isobutane with ethylene in the presence of the said $HF-BF_3$ catalyst to selectively produce isohexanes consisting mainly of 2,3-dimethylbutane, and to inhibit fragmentation and other secondary reactions which have heretofore been obtained with this catalyst.

Other objects and advantages of the invention will be apparent from the following description taken in conjunction with the appended claims.

The alkylation of an isoparaffin with a monoolefin of higher molecular weight than ethylene in the presence of liquid HF as a catalyst is well-known and has been practiced commercially. It is also known that the addition of a minor proportion by weight of $BF_3$ to a substantially anhydrous liquid HF catalyst enhances its activity so that the combined catalyst is capable of alkylating isobutane with ethylene at temperatures of the order of about 50–200° F. and generally about 100–150° F. In accordance with the prior suggestions in this particular art, wherein the combined catalyst contained about 0.1 to 10 mol percent or more of $BF_3$, and temperatures above 50° F. were employed, the resulting debutanized liquid alkylate contained a major proportion of isopentane as well as substantial yields of heptanes and heavier, with only a small proportion of 2,3-dimethylbutane. The fragmentation and other secondary reactions responsible for the formation of this type of liquid alkylate were considered inherent in the catalyst employed. Certain critical conditions of operation have heretofore been found for isobutane-ethylene alkylation with an aluminum halide type of catalyst to produce a liquid alkylate containing about 70% or more by volume of 2,3-dimethylbutane, which latter is especially valuable as a blending agent for aviation gasoline of the super-fuel type to increase maximum power output of supercharged engines at rich mixture operation. However, when applied to the $HF-BF_3$ catalyst, the said conditions gave rise to the fragmentation and secondary reactions specified and were entirely unsatisfactory in producing the superior alkylate containing a major proportion by volume of 2,3-dimethylbutane.

I have discovered that by the use of a $BF_3-HF$ mol ratio substantially less than 0.1, together with maintenance of the temperature in the alkylation reaction zone below 40° F. but above about —30° F., these fragmentation and secondary reactions can be inhibited and a total debutanized liquid alkylate is produced containing a major proportion by volume of 2,3-dimethylbutane. Furthermore, I have found that this alkylation can be carried out continuously by maintaining a body of substantially anhydrous liquid HF and hydrocarbons in a reaction zone, continuously introducing into said zone a charge of isobutane in liquid phase and ethylene, also introducing into the reaction zone $BF_3$ at a rate to maintain an operative $BF_3-HF$ mol ratio and which is less than about 10 grams of $BF_3$ per pound of hydrocarbon charged, and continuously discharging a stream of hydrocarbon reaction products from said alkylation reaction zone and recovering alkylate therefrom. In this manner, a total debutanized liquid alkylate containing more than 50% and up to about 80% or more by volume of 2,3-dimethylbutane is secured in good yields.

The reaction may be carried out either in batch or continuously. In a typical batch procedure, a steel reactor equipped with a mechanically driven stirrer has been employed. The reactor was charged with the required amounts of anhydrous liquid HF and liquefied isobutane. $BF_3$ was then introduced as a gas and the stirring mechanism started. The olefin was then charged at a regulated rate over a time interval of thirty minutes, and stirring was then continued an additional thirty minutes. The contents of the reactor were passed through a caustic scrubber to remove the HF, and then into a stabilizer where the product was debutanized. The stabilized alkylate was then analyzed by high temperature fractionation to obtain the hydrocarbon boiling range distribution curve, from which the composition of the alkylate was determined. The total isohexane cut was taken as the fraction boiling between 45° C. and 65° C.; and the 2,3-dimethylbutane fraction as that boiling between 55° C. and 65° C.

The following are results of typical batch runs carried out in the above-described manner, employing temperatures between 0° F. and 70° F. and $BF_3$-HF mol ratios between 0.014 and 0.059:

ondary reactions have set in at this temperature, even with the very small $BF_3$-HF mol ratio of 0.014, and the yield of 2,3-dimethylbutane is unsatisfactory.

In the following continuous runs, a copper-lined steel vessel of 1250 cc. capacity equipped with a cooling jacket and a mechanical agitator was employed. Liquid HF in the amount of 590–630 grams was charged to the reactor, and the system then filled with isobutane, leaving no free gas space in the reactor. The stirrer was then started and the temperature of the reactor contents adjusted to the desired level by circulating a cooling medium in the jacket. Then a charge of liquefied isobutane together with ethylene in Table I

| Run No. | 1 | 2 | 3 | 4 | 5 | 6 | 7 |
|---|---|---|---|---|---|---|---|
| Catalyst: | | | | | | | |
| HF wt., grams | 200 | 210 | 210 | 200 | 200 | 200 | 210 |
| $BF_3$ wt., grams | 40 | 20 | 40 | 40 | 40 | 15 | 10 |
| $BF_3$/HF ratio, mol | 0.059 | 0.028 | 0.056 | 0.059 | 0.059 | 0.022 | 0.014 |
| Gms. $BF_3$/lb. of Hy. charged | 28.4 | 14.2 | 28.4 | 28.6 | 28.1 | 10.5 | 7.1 |
| Hydrocarbons: | | | | | | | |
| Isobutane wt., grams | 580 | 580 | 580 | 580 | 580 | 580 | 580 |
| Ethylene wt., grams | 60 | 60 | 60 | 55 | 65 | 65 | 60 |
| Isobutane/Ethylene ratio, mol | 4.7 | 4.7 | 4.7 | 5.0 | 4.3 | 4.3 | 4.7 |
| Conditions: | | | | | | | |
| Temp., °F | 0 | 0 | 10 | 15 | 30 | 40 | 70 |
| Pressure, lb./in.² | 14 | 0 | 25 | 30 | 50 | 18 | 35 |
| Debutanized alkylate: | | | | | | | |
| Wt., grams | 124 | 100 | 166 | 163 | 181 | 168 | 200 |
| Yield, Wt. per cent based on ethylene charged | 206 | 167 | 273 | 296 | 278 | 258 | 333 |
| Comp., Vol. per cent approx.— | | | | | | | |
| Isopentane | 3 | 2 | 3 | 3 | 4 | 4 | 6 |
| Isohexanes total | 85 | 86 | 80 | 79 | 70 | 68 | 50 |
| 2,3-dimethylbutane | 82 | 84 | 73 | 72 | 57 | 61 | 39 |
| Heptanes and heavier | 12 | 12 | 17 | 18 | 21 | 28 | 44 |

In the above runs, the pressure maintained on the reactor varied from atmospheric (0 pounds per square inch gauge) to 50 pounds per square inch gauge. Due to the very small quantity of $BF_3$ added to the large amount of liquid HF and isobutane, the $BF_3$ was absorbed by the liquid without substantial pressure rise in the closed reactor. However, a substantial gas space was available in the reactor above the liquid contents; and, by comparison of these runs with the continuous runs listed hereinbelow, it is apparent that an appreciable amount of the $BF_3$ added existed in gas phase in the upper portion of the reactor. In addition to the $BF_3$-HF mol ratio for each of the above runs, the foregoing table also lists the amount of $BF_3$ added in grams per pound of hydrocarbon charged for comparison with the continuous runs. The foregoing discussion shows that the proportion of $BF_3$ actually in solution or actively absorbed in the liquid contents of the reactor is less than the $BF_3$-HF mol ratio indicated, which is based on the total quantities of HF and $BF_3$ added.

Runs 1–4 show that excellent results were secured at temperatures from 0 to 15° F. with $BF_3$-HF mol ratios below 0.06. The yield of debutanized alkylate on the basis of the ethylene charged was somewhat greater at the higher temperatures within this range, but the proportion of 2,3-dimethylbutane in the total debutanized alkylate was highest for the runs at 0° F. Runs 5 and 6 indicate that the temperature is approaching a critical upper limit. It is to be noted that the $BF_3$-HF mol ratio was quite low for run 6 carried out at 40° F., but the yield of 2,3-dimethylbutane was nevertheless substantially lower than in runs 1–4. Run 7 carried out at 70° F. shows that substantial fragmentation and secthe indicated mol ratio was charged to the reactor along with a controlled small amount of $BF_3$. Reaction products overflowed from the reactor into an inclined settler where the catalyst rapidly dropped out and was returned by gravity to the reactor. The resulting hydrocarbon reaction products were then passed through a dry scrubber containing soda-lime to neutralize $BF_3$ and HF carried out of the settler, and the neutralized hydrocarbons passed to receivers. Hydrocarbon samples collected in the receivers were withdrawn at regular intervals during the course of a continuous run, and these samples were stabilized to recover the debutanized liquid alkylate. The latter was then analyzed by high temperature fractional distillation to determine composition. Yield in the following table is expressed both as an average for the active sample periods, and as the maximum yield obtained for any single sample period, of each run. For two of the listed runs (runs 9 and 10), samples obtained were combined and octane determinations made on the combined alkylate.

For these continuous runs, the $BF_3$ charge rate is expressed in terms of the hydrocarbon charge as the most accurate measurement of this factor. Moreover, it will be noted that a substantial pressure of 225–250 pounds per square inch was maintained on the reactor which, together with the absence of gas space within the reactor, insured that the $BF_3$ was maintained in solution or actively absorbed within the liquid contents of the reactor. Under these conditions, it was found that an even smaller proportion of $BF_3$ than employed in the batch runs listed above was active in catalyzing the desired selective reaction. The conditions employed and the results obtained for three typical continuous runs are listed in the following table:

Table II

| Run No | 8 | 9 | 10 |
|---|---|---|---|
| Acid/Hy. vol. ratio | 1.0 | 1.0 | 1.0 |
| Isobutane/ethylene mol ratio | 5.7 | 5.7 | 5.9 |
| Contact time min | 20 | 20 | 20 |
| Temperature, °F | 0 | 0 | 0 |
| Pressure, lb./in.$^2$ | 225 | 250 | 250 |
| BF$_3$ charge rate, grams/lb of hydrocarbon charged | 2.0 | 8.0 | 4.0 |
| Debutanized Alkylate: | | | |
| Yield, wt. percent based on ethylene charged— | | | |
| Average | 174 | 284 | 248 |
| Max | 192 | 350 | 293 |
| Comp. vol. percent approx.— | | | |
| Isopentane | 8 | 22 | 17 |
| Isohexanes total | 76 | 58 | 69 |
| 2,3-dimethylbutane | 72 | 52 | 65 |
| Heptanes and heavier | 16 | 20 | 14 |
| Depentanized Alkylate: | | | |
| CFRM octane clear | | 88 | |
| AFD-3C with 3 ml. TEL/gal.— | | | |
| Rich | | S+1.5 | |
| Lean | | S+0.2 | |
| Debutanized Alkylate: | | | |
| CFRM octane clear | | | 89.4 |
| CFRM+1 ml. TEL/gal | | | isooctane+0.03 |

Comparing runs 8 and 10, it will be noted that both gave a high proportion of 2,3-dimethylbutane in the total debutanized alkylate at 0° F., with the results from the standpoint of yield favoring run 10 employing a charge rate of four grams of BF$_3$ per pound of hydrocarbon charged. Run 9 employing a BF$_3$ charge rate of eight grams of BF$_3$ per pound of hydrocarbon charged, appears to be approaching the critical upper limit under the conditions used, since fragmentation is somewhat more pronounced and yield of 2,3-dimethylbutane is only slightly over 50% by volume of the total alkylate.

On the basis of a substantial number of continuous runs, the BF$_3$ charge rate should be maintained less than about 10 grams of BF$_3$ per pound of hydrocarbon charged and preferably 2–6 grams for pressures in excess of 150 pounds per square inch, and preferably above 200 pounds per square inch. Ordinarily, there is no reason to exceed a pressure of about 500 pounds per square inch. As set forth above, the temperature is maintained within the range of −30 to +40° F. and preferably about −10 to +15° F. A contact time of at least about 15 minutes is used with the said BF$_3$ charge rates, the contact time ordinarily being between 20 and 60 minutes. It was found that when the contact time was reduced, the BF$_3$ charge rate should be increased within the above range to compensate therefor, particularly in the lower portions of the contact time range. While of course contact times in excess of 60 minutes can be employed, this is undesirable from the standpoint of plant capacity. Moreover, the volume ratio of liquid HF to hydrocarbons in the reaction zone should be maintained at least about 0.2 and preferably at least 0.8, with acid to hydrocarbon volume ratios of around 1.0 and somewhat higher being preferred. The other usual conditions for isoparaffin alkylation are followed, including a substantial molar excess of isobutane to ethylene in the charge. Thus, isobutane-ethylene mol ratios of the order of about 2:1 to 10:1 are used, with ratios of about 3:1 to 6:1 being preferred.

If desired, a proportion of the settled hydrocarbon phase can be recycled to the reactor to increase the isobutane to ethylene contact ratio in well-known manner. In such case, it is found that the charge rate of BF$_3$ may be somewhat reduced, since a proportion of the BF$_3$, which would otherwise pass off with the effluent from the reactor, is thereby returned to the reaction zone. While the continuous addition of BF$_3$ to the reactor is preferred, it is possible to add the BF$_3$ intermittently, particularly where hydrocarbon recycle is employed.

Any suitable conventional type of alkylation reactor can be employed in accordance with the present invention. Moreover, in place of a stirred reactor as described above, there may be used a tower type of reactor containing a relatively quiescent body of the liquid HF catalyst, through which the hydrocarbon together with added BF$_3$ is passed in dispersed droplet form, as described and claimed in the copending application of Louis A. Clarke, Serial No. 470,043, filed December 24, 1942, now Patent No. 2,407,136, dated September 3, 1946.

Obviously many modifications and variations of the invention, as hereinbefore set forth, may be made without departing from the spirit and scope thereof, and therefore only such limitations should be imposed as are indicated in the appended claims.

I claim:

1. In the continuous alkylation of isobutane with ethylene in the presence of an alkylation catalyst consisting essentially of a major proportion of substantially anhydrous liquid HF and a minor proportion of BF$_3$, the improvement which comprises maintaining a body of substantially anhydrous liquid HF and hydrocarbons in a liquid filled reaction zone maintained under alkylating conditions including an operative acid to hydrocarbon volume ratio of at least about 0.8, continuously introducing a charge of isobutane in liquid phase and ethylene, with the isobutane in substantial molar excess of the ethylene, into said reaction zone, also continuously introducing along with the hydrocarbon feed into said reaction zone BF$_3$ at a rate of not more than 4 grams of BF$_3$ per pound of hydrocarbon charged, maintaining the temperature of said reaction zone within the range of −30 to 15° F., at a pressure of at least 150 pounds per square inch to keep the BF$_3$ absorbed in the liquid filled reaction zone mixture, continuously discharging a stream of hydrocarbon reaction products and recovering therefrom a total debutanized liquid alkylate containing at least 65% by volume of 2,3-dimethylbutane.

2. The method according to claim 1, wherein the acid to hydrocarbon volume ratio is about 1.0, the temperature is about 0° F., the pressure is about 200–500 pounds per square inch, the BF$_3$ rate is about 2–4 grams of BF$_3$ per pound of hydrocarbon charged, and the contact time is about 20–60 minutes.

HERBERT E. VERMILLION.

REFERENCES CITED

The following references are of record in the file of this patent:

UNITED STATES PATENTS

| Number | Name | Date |
|---|---|---|
| 2,342,677 | Linn | Feb. 29, 1944 |
| 2,366,731 | Ipatieff et al. | Jan. 9, 1945 |
| 2,374,819 | Kanhofer et al. | May 1, 1945 |
| 2,408,753 | Burk | Oct. 8, 1946 |
| 2,411,992 | Grosse et al. | Dec. 3, 1946 |